United States Patent [19]
Cote

[11] Patent Number: 5,417,202
[45] Date of Patent: May 23, 1995

[54] GAS FRYER HEAT EXCHANGER
[75] Inventor: Joseph A. C. Cote, San Antonio, Tex.
[73] Assignee: America's Favorite Chicken Company, Atlanta, Ga.
[21] Appl. No.: 271,659
[22] Filed: Jul. 7, 1994
[51] Int. Cl.6 .......................... A47J 27/00; A47J 37/12; F24D 1/00
[52] U.S. Cl. ........................................ 126/391; 99/330; 99/403; 126/375
[58] Field of Search ................. 99/403, 407, 408, 330, 99/336; 126/390, 391, 374–376, 378, 360 R; 122/44.1, 49, 135.1, 136 R; 219/421, 437, 438; 431/1

[56] References Cited
U.S. PATENT DOCUMENTS

| | | |
|---|---|---|
| 1,630,309 | 5/1927 | Pitman . |
| 2,176,869 | 10/1939 | Childs . |
| 2,305,039 | 12/1942 | Stead . |
| 2,429,360 | 10/1947 | Kells . |
| 2,655,144 | 10/1953 | Keating . |
| 3,217,704 | 11/1965 | Anetsberger . |
| 3,640,208 | 2/1972 | Size . |
| 3,769,959 | 11/1973 | Parker ........................ 165/109 |
| 4,228,730 | 10/1980 | Schindler et al. ............ 99/407 |
| 4,481,873 | 11/1984 | Keating . |
| 4,660,542 | 4/1987 | Scherer ......................... 99/403 |
| 4,724,823 | 2/1988 | Simpson ....................... 431/1 |
| 4,848,317 | 7/1989 | Prudhomme et al. . |
| 4,848,318 | 7/1989 | Brewer ........................ 126/390 |
| 4,898,151 | 2/1990 | Luebke et al. . |
| 4,905,664 | 3/1990 | Dunham . |
| 4,911,233 | 3/1990 | Chao et al. ................... 126/299 R |
| 4,913,041 | 4/1990 | Taber et al. .................. 126/391 |
| 5,038,753 | 8/1991 | Uokoyama et al. . |
| 5,059,582 | 2/1991 | Almond et al. . |
| 5,209,218 | 5/1993 | Daneshvar et al. . |

Primary Examiner—Timothy F. Simone
Attorney, Agent, or Firm—Banner, Birch, McKie & Beckett

[57] ABSTRACT

The present invention provides a heat exchanger for a fryer having a vat or tank filled to a selected level with a cooking medium such as shortening or oil. The heat exchanger includes a plurality of heat transfer tubes each having an inlet end and an outlet end, and at least one of the plurality of heat transfer tubes extending at a first angle, at least one of the plurality of heat transfer tubes extending at a second angle generally opposite to the first angle, and at least one of the plurality of heat transfer tubes extending horizontally. At least one mixing plenum having a plurality of inlet openings and a plurality of outlet openings is also provided, and at least some of the heat transfer tubes are sealingly connected to the mixing plenum. The plurality of heat transfer tubes and the mixing plenum are disposed within the vat of shortening in order to maximize the exposed heat transfer surface and thereby increase the heat transfer to the shortening.

27 Claims, 8 Drawing Sheets

GAS FRYER HEAT EXCHANGER

TECHNICAL FIELD

The present invention relates to a deep fat gas fryer, and more particularly, to a deep fat gas fryer incorporating a heat exchanger having a plurality of heat transfer tubes and a plurality of mixing plenums disposed within the shortening tank.

BACKGROUND OF THE INVENTION

Deep fat flyers, or gas fryers, are commercially used by restaurants, institutional kitchens, and fast food establishments for cooking a variety of food products, such as french fries, fish, fried chicken, and the like. The gas fryer must not only accommodate the individual heating requirements of each particular food product, but it must also maintain consistency and uniformity of taste and texture during the cooking process. The food product is cooked by totally immersing it within a vat or tank that is filled with heated oil or shortening. The oil is typically heated using a recirculating flow of heated gas that is forced or drawn through flow passages that are in thermal communication with wall portions of the cooking vat. In other prior art flyers, the flow passages are disposed within the vat itself in order to increase the heat transfer to the cooking oil. In both cases, however, maintaining a uniform temperature throughout the cooking zone of the shortening has proved a rather difficult manufacturing task. Examples of such prior art systems are shown in U.S. Pat. Nos. 4,481,873 to Keating; 4,848,317 to Prudhomme et al.; 4,898,151 to Luebke et al. and 5,050,582 to Almond et al.

Generally, in such prior art systems, the heated gas flows through the flow passages from an inlet to an outlet before being exhausted into the atmosphere. The heating systems of the prior art are extremely inefficient, however, and the average temperature of the exhaust gas is still extremely hot, on the order of 1200° F. Due to the relatively short period of time in which the heated gas actually remains within the flow passages, the heat transfer to the cooking oil is thereby limited and potentially usable heating energy is wasted by being exhausted into the atmosphere.

Accordingly, in view of the foregoing, it is an object of the present invention to provide a gas fryer having a heating system which improves the overall efficiency of the fryer, reduces the exhaust temperature of the heated gas and which eliminates the problems and disadvantages found in the prior art.

SUMMARY OF THE INVENTION

The present invention provides an economical design for a gas fryer heat exchanger. The heat exchanger utilizes a combination of inclining, declining, and horizontal heat transfer tubes and mixing plenums connected thereto in order to ensure that there is a thorough mixing of the heat transfer fluid passing through the heat transfer tubes. This is further accomplished by positioning the heat exchanger, including both the heat transfer tubes and the mixing plenums, within the tank or vat that is filled with the shortening or other cooking medium.

According to the present invention, the gas fryer heat exchanger includes a first, second, and third plurality of heat transfer tubes each having a respective inlet end and a respective outlet end. At least one of the first, second, and third plurality of heat transfer tubes extends at an angle. The heat exchanger further includes a first mixing plenum having a plurality of inlet openings and a plurality of outlet openings, a second mixing plenum having a plurality of inlet openings and a plurality of outlet openings, and a heat source for heating the fluid flowing into the inlet ends of the heat transfer tubes. The plurality of heat transfer tubes and the mixing plenums are disposed within the vat of shortening in order to increase the exposed heat transfer surface and thereby increase the heat transfer from the heated fluid to the shortening. In a preferred embodiment, the first outlet ends of the first plurality of heat transfer tubes and the second inlet ends of the second plurality of heat transfer tubes are sealingly connected to the first mixing plenum and the second outlet ends of the second plurality of heat transfer tubes and the third inlet ends of the third plurality of heat transfer tubes are sealingly connected to the second mixing plenum in order to achieve a thorough mixing of the heated fluid.

BRIEF DESCRIPTION OF THE DRAWINGS

The above description and other objects, advantages and features of the present invention will be more fully understood and appreciated by reference to the specification and accompanying drawings, wherein.

DETAILED DESCRIPTION OF THE PREFERRED EMBODIMENTS

Figure 1:
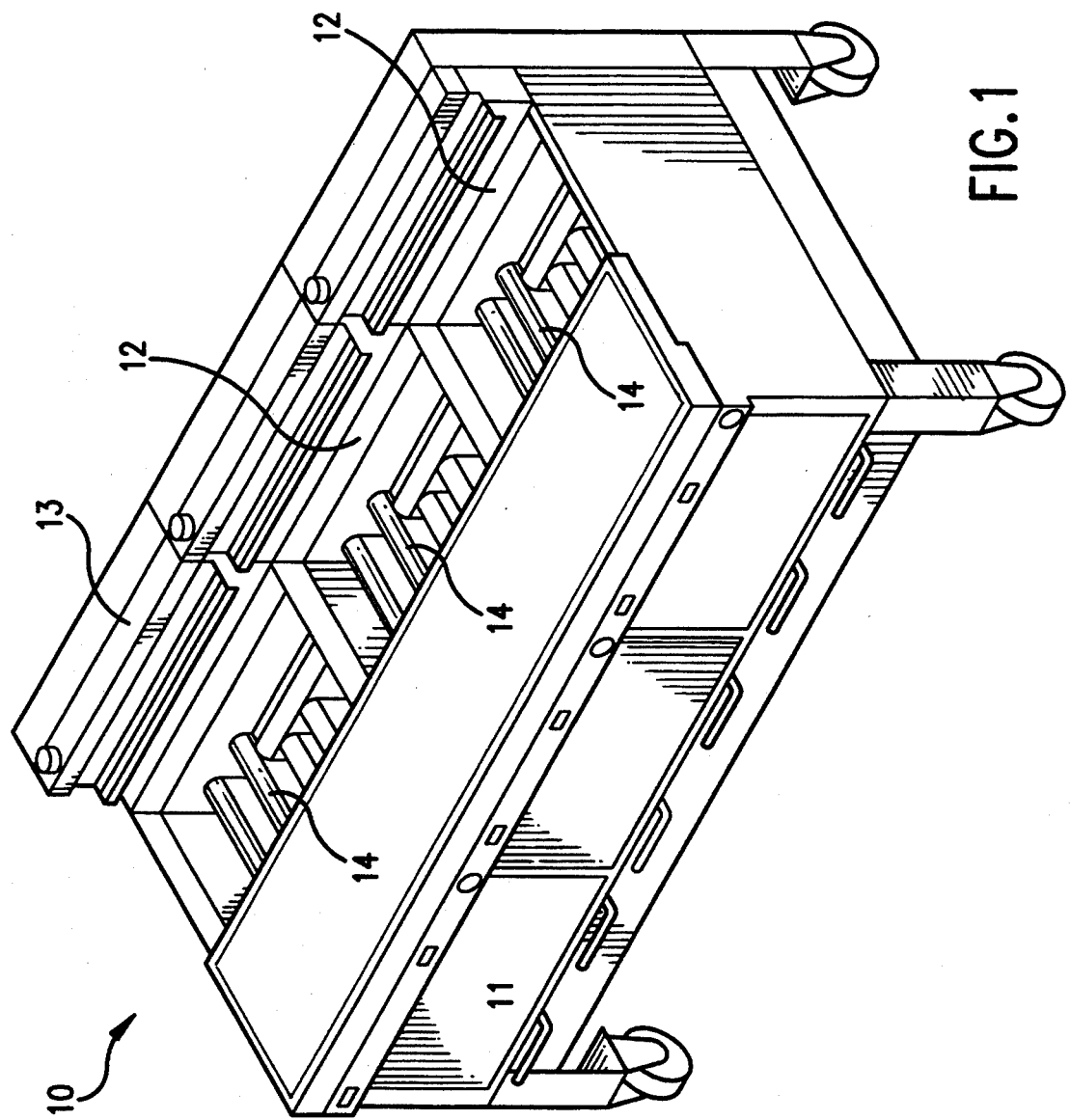
FIG. 1 is a perspective view of a heat exchanger positioned in a gas fryer vat according to the present invention.
Figure 2:
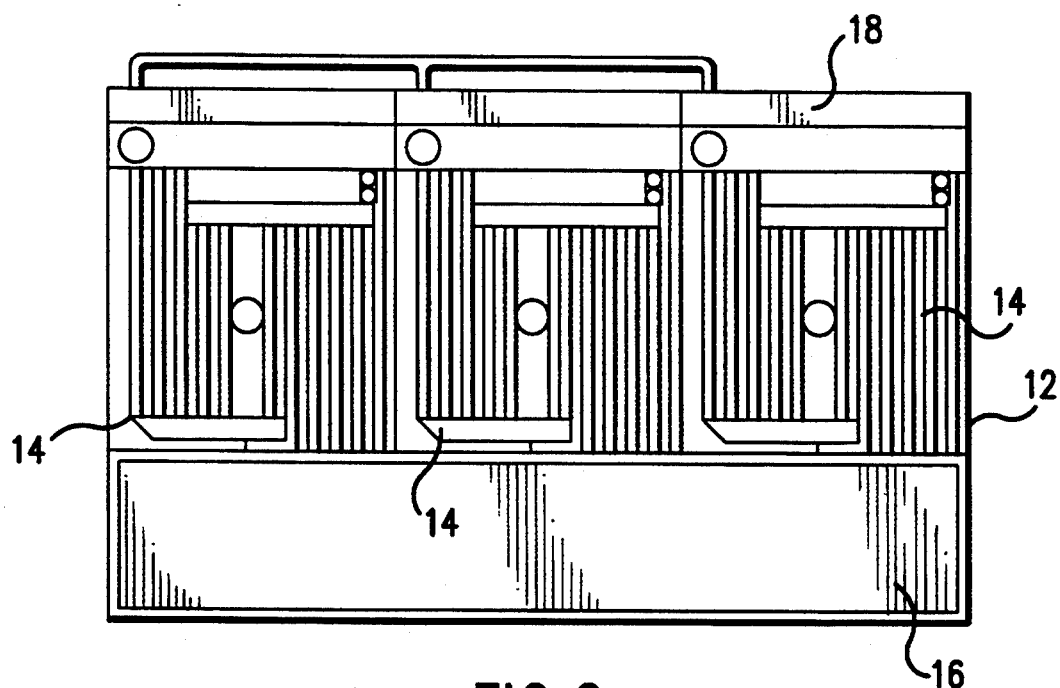
FIG. 2 is a top plan view thereof.
Figure 4:
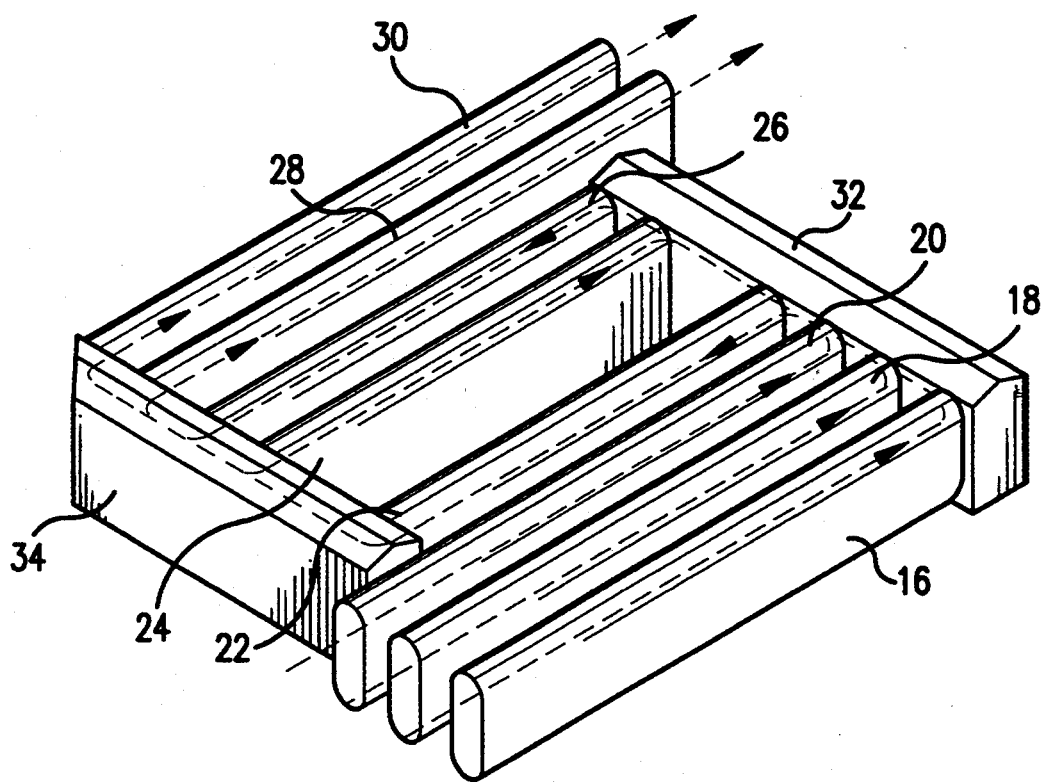
FIG. 4 is a perspective view of the heat exchanger shown in FIG. 1.
Figure 3:
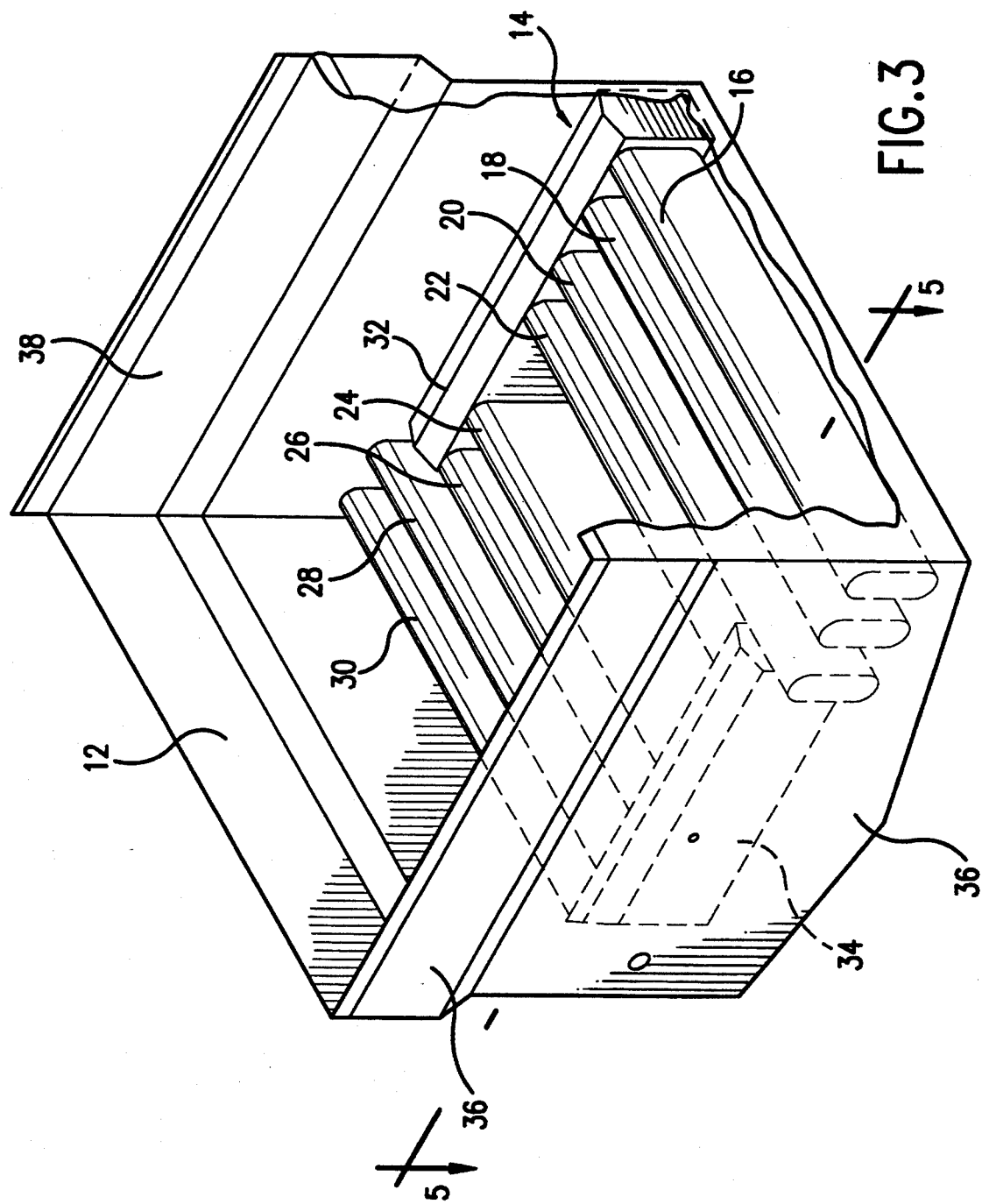
FIG. 3 is a perspective view thereof, partially broken away for clarity.
Figure 5:
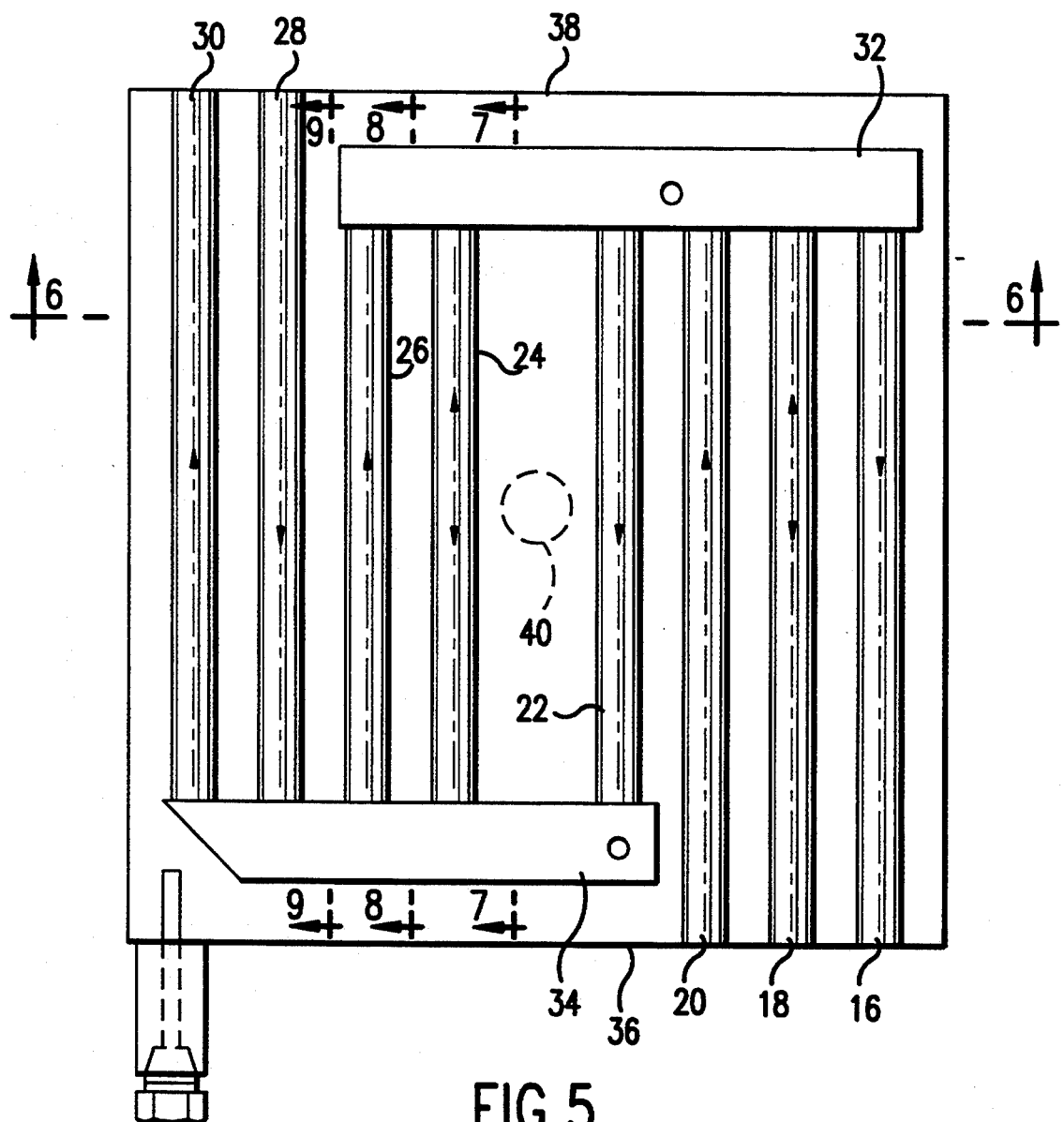
FIG. 5 is a cross section taken along line 5—5 of FIG. 3.

Referring to FIGS. 1-3, a gas fryer according to the present invention is shown generally by reference numeral 10. The gas fryer preferably includes a plurality of vats 12 for holding the shortening, oil, or other cooking medium, a heat exchanger 14 for heating the shortening in each vat 12, a burner 11 for heating the fluid flowing through the heat exchanger, and a blower motor 13 for drawing or forcing the heated fluid through the heat exchanger 14. Due to its efficiency and economic availability, the heat exchange fluid generally used in the present invention and in prior art gas flyers is air; however, other gaseous fluids or liquids may of course also be considered as the development thereof permits. In the preferred embodiment of FIGS. 1-9, heat exchanger 14 includes a plurality of heat transfer conduits or tubes 16, 18, 20, 22, 24, 26, 28, 30 and two mixing plenums 32, 34. The direction of travel of the heated fluid through heat exchanger 14 is schematically illustrated in FIG. 4 to show the heated fluid entering the vat through inlet heat transfer tubes 16, 18, 20, mixing in plenum 32, passing through heat transfer tubes 22, 24, 26, mixing in plenum 34, and then exiting the vat through outlet heat transfer tubes 28, 30. As most clearly shown in FIG. 4, the heat transfer tubes are oblong, preferably having an end opening which is longer and generally straight along two sides and curved upper and lower surfaces. This configuration of the heat transfer tubes creates a larger surface area than conventional circular tubes. Similarly, the mixing plenums are generally rectangular and extend almost the entire width of the heat exchanger. Thus, the large exposed surface area of the heat transfer tubes and the plenums within vat 12 allows for maximum heat transfer from the heated fluid passing through the heat exchanger 14 to the hot cooking oil within the vat.

Figure 6:
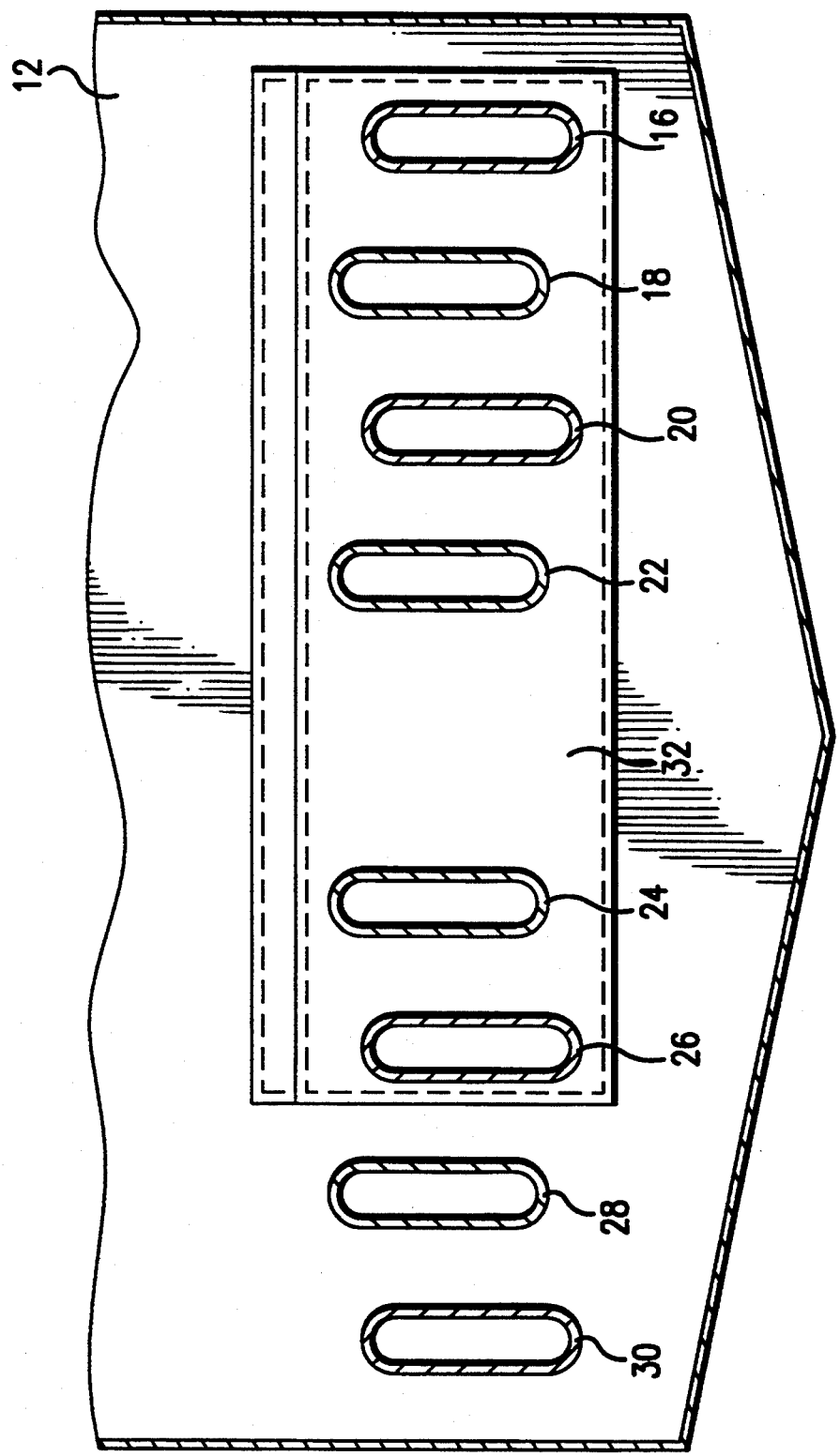
FIG. 6 is a cross section taken along line 6—6 of FIG. 5.
Figure 7:
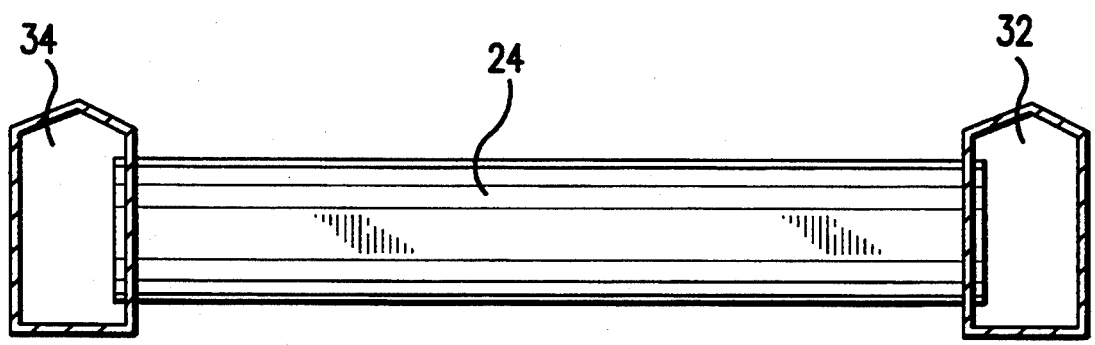
FIG. 7 is a cross section taken along line 7—7 of FIG. 5.
Figure 8:
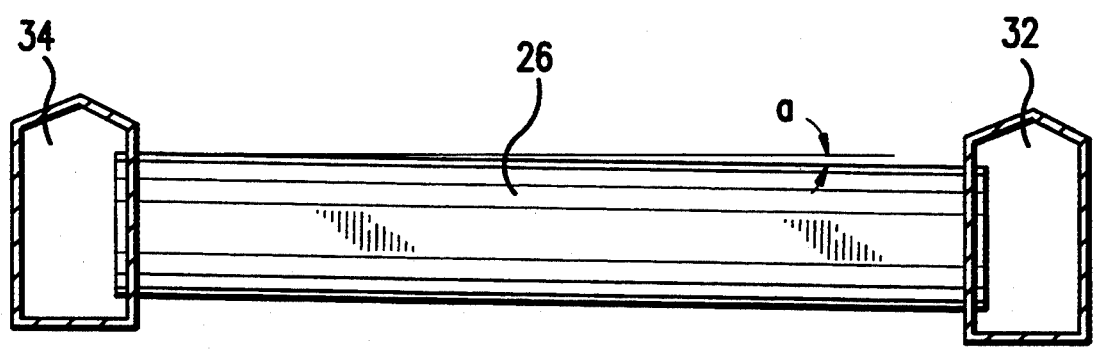
FIG. 8 is a cross section taken along line 8—8 of FIG. 5.
Figure 9:
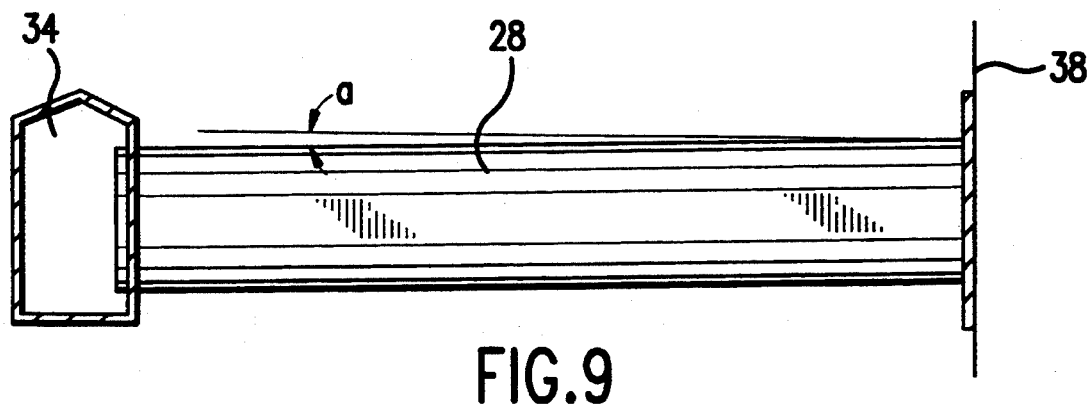
FIG. 9 is a cross section taken along line 9—9 of FIG. 5.

Referring also to FIGS. 5-9, the inclination of the heat transfer tubes within the vat is more clearly shown by the direction of the arrows. In a preferred embodiment, the set of inlet heat transfer tubes includes tube 16 sloping downwards from plenum 32 to a sidewall 36 of vat 12, tube 18 extending horizontally between plenum 32 and sidewall 36, and tube 20 sloping downwards from sidewall 36 to plenum 32 (opposite to the slope of tube 16). The second set of heat transfer tubes extending from plenum 32 to plenum 34 includes tube 22 sloping downwards from plenum 32 to plenum 34, tube 24 extending horizontally, and tube 26 sloping downwards from plenum 34 to plenum 32 (opposite to the slope of tube 22). The set of outlet heat transfer tubes includes tube 28 sloping downwards from a sidewall 38 of the vat to plenum 34 and tube 30 sloping downwards from plenum 34 to sidewall 38. The use of three separate sets of inclining, declining and horizontal heat transfer tubes and the mixing plenums ensures that there is a thorough mixing of the heated fluid passing through the heat transfer tubes within the shortening. In addition, since the tubes are inclined, declined and horizontal, heat transfer to the shortening occurs at varying depths within the vat—thus ensuring that more uniform heat dispersion and more uniform cooking is achieved. As shown in FIG. 6, a cross section through a vertical plane of the heat transfer tubes illustrates the vertical offset which is obtained by having inclining, declining, and horizontal tubes. In an alternate embodiment of the invention, all the heat transfer tubes could be positioned horizontally, but staggered relative to one another. Thus, the vertical offset such as that shown in FIG. 6 could still be obtained. To further facilitate mixing of the heated fluid within the heat transfer tubes, turbulence inducing baffles may be incorporated within the plenums.

In a preferred embodiment of the present invention, gas fryer 10 includes a vat 12 having internal dimensions of 20"×20" or 18"×18". Heat exchanger 14 is therefore correspondingly sized to be disposed within vat 12. For example, for a 20" vat, heat transfer tubes 16, 18, 20, 28, 30 are approximately 16.9" long and heat transfer tubes 22, 24, 26 are approximately 13.9" long. Plenum 32 is disposed approximately 1.0" from sidewall 38 and plenum 34 is disposed approximately 1.0" from sidewall 36. The center lines of heat transfer tubes 16, 30 are disposed approximately 1.5" inwards from opposing sidewalls of vat 12, and the center lines of the remaining heat transfer tubes are disposed approximately 2.125" from one another or, in the case of tubes 22 and 24, positioned 2.125" from the center line of drain 40. Similarly, for an 18" vat, heat transfer tubes 16, 18, 20, 28, 30 are approximately 14.9" long and heat transfer tubes 22, 24, 26 are approximately 11.9" long. As in the 20" vat embodiment, plenum 32 is disposed approximately 1.0" from sidewall 38 and plenum 34 is disposed approximately 1.0" from sidewall 36. The center lines of heat transfer tubes 16, 30 are also disposed approximately 1.5" inwards from opposing sidewalls of vat 12, and the center lines of the remaining heat transfer tubes are disposed approximately 2.125" from one another. As shown generally in FIGS. 7-9, for both the 20" and 18" preferred embodiments, heat transfer tubes 18, 24 are level and heat transfer tubes 16, 20, 22, 26, 28, 30 slope in their respective directions at an angle "a" of approximately 1° (one degree). To increase or decrease the heat transfer zone as desired, the angle of the sloping heat transfer conduits can be between approximately 1° and 2°, or thereabouts.

Figure 10:
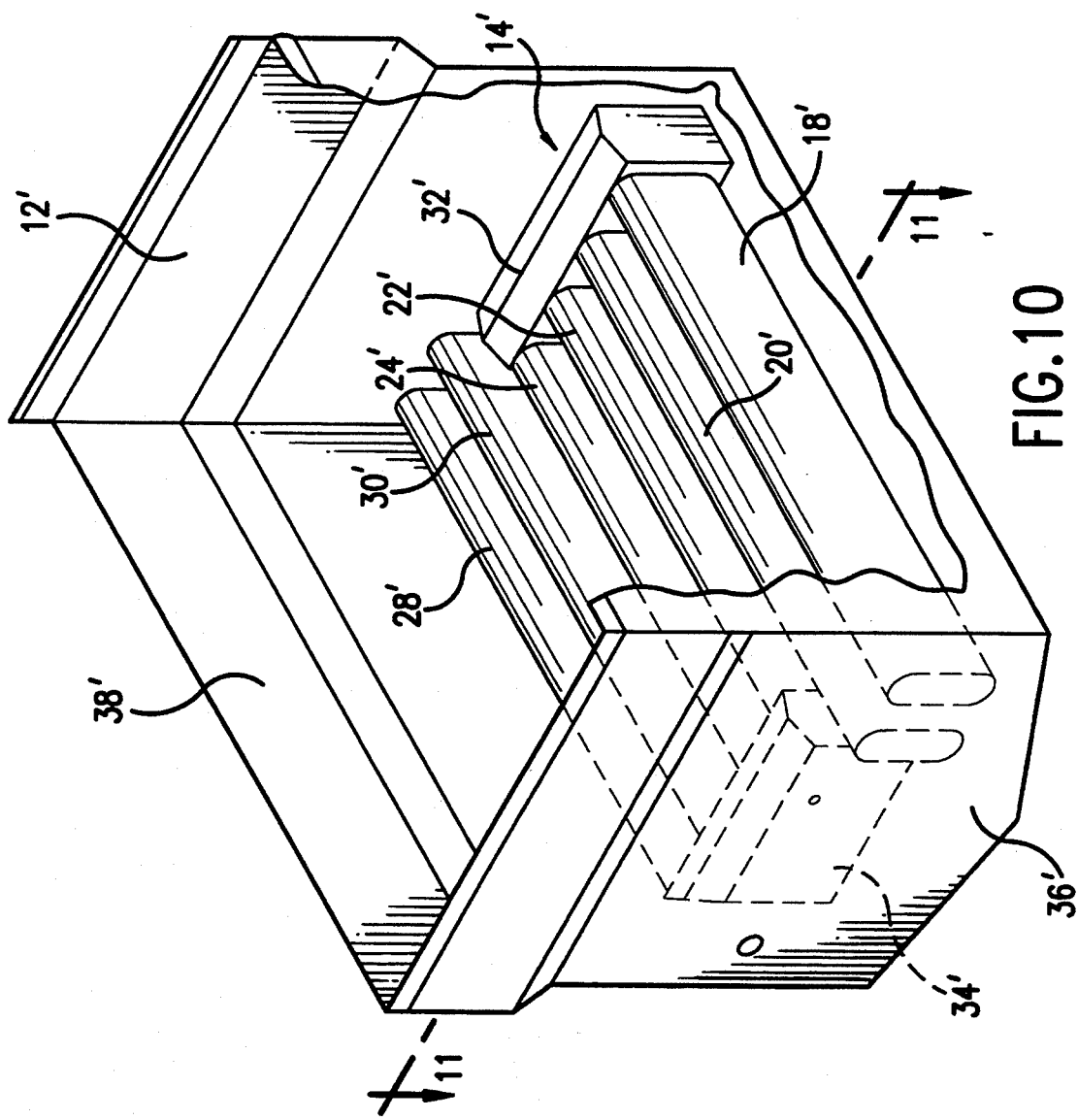
FIG. 10 is a perspective view of a heat exchanger positioned in a gas fryer according to a further embodiment of the invention, partially broken away for clarity.
Figure 11:
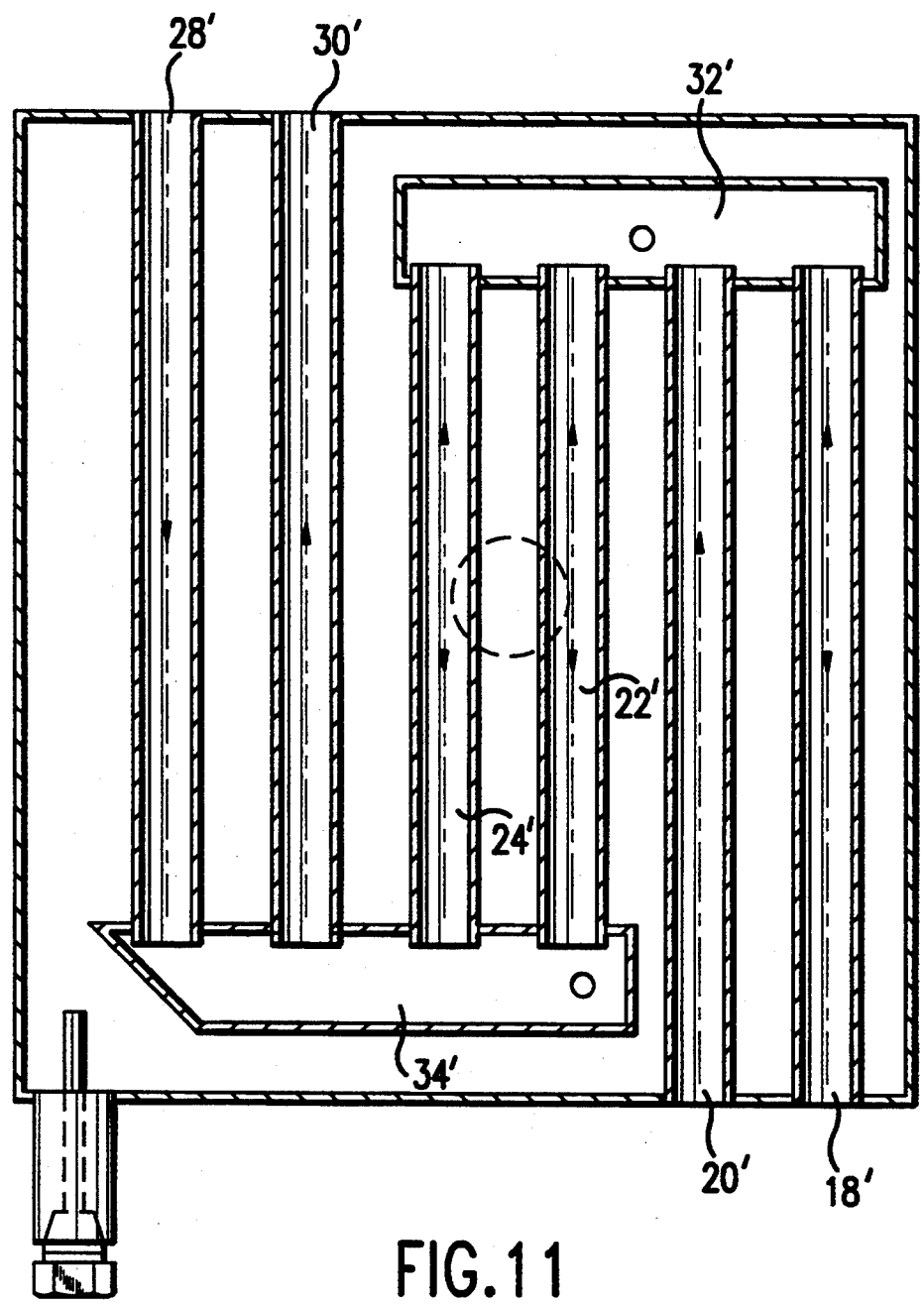
FIG. 11 is a cross section taken along line 11—11 of FIG. 10.

Referring to FIGS. 10 and 11, a further embodiment of the heat exchanger is illustrated generally by reference numeral 14' for use in a vat 12' having inner dimensions of 14"×14". Heat exchanger 14' is therefore correspondingly sized to be disposed within vat 12'. Preferably, for the 14" vat embodiment, only two inlet heat transfer tubes 18', 20', two mixing heat transfer tubes 22', 24' and two outlet heat transfer tubes 28', 30' are utilized. Similar to the above embodiments, inlet tube 18' extends horizontally from sidewall 36' to plenum 32' and inlet tube 20' slopes downwardly from sidewall 36' to plenum 32'. Heat transfer tube 22' slopes downwardly from plenum 32' to 34' and heat transfer tube 24' extends horizontally from plenum 32' to plenum 34'. Outlet tube 28' slopes downwardly from sidewall 38' to plenum 34' and outlet tube 30' slopes downwardly from plenum 34' to sidewall 38'. Although not specifically illustrated, as in the above embodiments, heat transfer tubes 18', 24' are level and heat transfer tubes 20', 22', 28', 30' slope in their respective directions at an angle of approximately 1°. Thus, as in the above embodiments, the use of separate sets of inclining, declining and horizontal heat transfer tubes and the mixing plenums ensures that there is a thorough mixing of the heated fluid passing through the heat transfer tubes within the shortening. In addition, even though only two tubes are used in each set, since the tubes are still inclined, declined and horizontal, heat transfer to the shortening occurs at varying depths within the vat—thus ensuring that more uniform heat dispersion and more uniform cooking is achieved. The dimensions of the heat transfer tubes are also reduced to accommodate the smaller vat dimensions. For example, heat transfer tubes 18', 20', 28', 30' are approximately 10.9" long and heat transfer tubes 22', 24' are approximately 7.9" long. Plenum 32' is disposed approximately 1.0" from sidewall 38' and plenum 34' is disposed approximately 1.0" from sidewall 36'. The center lines of heat transfer tubes 18', 28' are disposed approximately 1.6" inwards from opposing sidewalls of vat 12', and the center lines of the remaining heat transfer tubes are disposed approximately 2.125" from one another.

As shown in FIG. 6 for all embodiments, heat exchanger 14, 14' is positioned above the bottom surface of the vat by approximately 3" to 5". This placement of the heat exchanger within vat 12, 12' creates a "cold zone", i.e., the temperature of the shortening below the surface of the heat exchanger (approximately 200° F.) is significantly less than the temperature of the hot shortening above the heat exchanger (approximately 350° F.). This construction prevents food particles that fall into the shortening from sitting on the bottom of the vat and continuing to cook, thereby increasing the useful life of the shortening, oil or other cooking medium within the vat.

The above embodiments of the present invention provide considerable advantage over the prior art both in manufacturing and operating costs. The present invention is less costly to manufacture due to the simplicity of the design and reduction in the amount of labor and components. The efficiency of operation also results in less energy requirements for heating the heat transfer fluid. That is, the low volume of the heated fluid passing through heat exchanger 14, 14' allows for maximum heat transfer and heating of the fluid. The low flow rate of the heated fluid allows it to be retained within the heat exchanger for a longer period of time to thereby increase the rate of heat transfer to the shortening or other cooking medium within the vat. In a preferred embodiment, the flow rate of the heated fluid is approximately 65 ft$^3$/min. This is turn reduces the required heat input or BTUs to the fluid and reduces the outlet temperature of the heated fluid to approximately 400°–450° F., instead of 1200° F. generally found in gas fryers of the prior art.

It will be obvious to one of ordinary skill in the art that numerous modifications may be made without departing from the true spirit and scope of the present invention, which is to be limited only by the appended claims.

We claim:

1. A heat exchanger for a fryer having a tank filled to a selected level with shortening, said heat exchanger comprising:
   a first plurality of heat transfer conduits each having a first inlet end and a first outlet end, at least one of said first plurality of heat transfer tubes sloping from one said end to the other said end;
   a second plurality of heat transfer conduits each having a second inlet end and a second outlet end, at least one of said second plurality of heat transfer conduits sloping from one said end to the other said end;
   a third plurality of heat transfer conduits each having a third inlet end and a third outlet end, at least one of said third plurality of heat transfer conduits sloping from one said end to the other said end;
   a first mixing plenum having a plurality of inlet openings and a plurality of outlet openings;
   a second mixing plenum having a plurality of inlet openings and a plurality of outlet openings; and
   heating means for heating gas flowing into said first inlet ends of said first plurality of heat transfer conduits;
   wherein said first outlet ends of said first plurality of heat transfer conduits and said second inlet ends of said second plurality of heat transfer conduits are sealingly connected to said first mixing plenum;
   wherein said second outlet ends of said second plurality of heat transfer conduits and said third inlet ends of said third plurality of heat transfer conduits are sealingly connected to said second mixing plenum; and
   wherein said plurality of heat transfer conduits and said mixing plenums are disposed within the tank of shortening.

2. The heat exchanger of claim 1 wherein each said plurality of heat transfer conduits includes at least two heat transfer conduits.

3. The heat exchanger of claim 2 wherein said first plurality of heat transfer conduits includes an inclining conduit sloping upwards from said first inlet end to said first outlet end, a declining conduit sloping downwards from said first inlet end to said first outlet end, and a horizontal conduit extending horizontally from said first inlet end to said first outlet end.

4. The heat exchanger of claim 3 wherein said second plurality of heat transfer conduits includes an inclining conduit sloping upwards from said second inlet end to said second outlet end, a declining conduit sloping downwards from said second inlet end to said second outlet end, and a horizontal conduit extending horizontally from said second inlet end to said second outlet end.

5. The heat exchanger of claim 4 wherein said third plurality of heat transfer conduits includes an inclining conduit sloping upwards from said third inlet end to said third outlet end and a declining conduit sloping downwards from said third inlet end to said third outlet end.

6. The heat exchanger of claim 2 wherein said first plurality of heat transfer conduits includes a horizontal conduit extending horizontally from a said first inlet end to said first outlet end and a sloping conduit extending from said first inlet end to said first outlet end.

7. The heat exchanger of claim 6 wherein said sloping conduit of said first plurality of conduits declines from a side wall of the tank to said first mixing plenum.

8. The heat exchanger of claim 6 wherein said second plurality of heat transfer conduits includes a sloping conduit extending from said second inlet end to said second outlet end.

9. The heat exchanger of claim 8 wherein said sloping conduit of said second plurality of conduits declines from said first mixing plenum to said second mixing plenum.

10. The heat exchanger of claim 8 wherein said third plurality of heat transfer conduits includes an inclining conduit sloping upwards from said third inlet end to said third outlet end and a declining conduit sloping downwards from said third inlet end to said third outlet end.

11. A heat exchanger for a fryer having a vat filled to a selected level with shortening, said heat exchanger comprising:
   a plurality of heat transfer conduits each having an inlet end and an outlet end, at least one of said plurality of heat transfer conduits sloping upwards from said inlet end to said outlet end and at least one of said plurality of heat transfer conduits sloping downwards from said inlet end to said outlet end;
   at least one mixing plenum having a plurality of inlet openings and a plurality of outlet openings, at least one of said plurality of heat transfer conduits being sealingly connected to said mixing plenum;
   wherein said plurality of heat transfer conduits and said at least one mixing plenum are disposed within the vat of shortening.

12. The heat exchanger of claim 11 wherein said plurality of heat transfer conduits includes at least three heat transfer conduits.

13. The heat exchanger of claim 11 wherein said plurality of heat transfer conduits includes three sets of conduits, each set having at least two said heat transfer conduits.

14. The heat exchanger of claim 11 wherein said at least one mixing plenum comprises a first mixing plenum and a second mixing plenum.

15. The heat exchanger of claim 11 wherein said plurality of heat transfer conduits includes at least one conduit extending from a side wall of the vat to one of said plurality of inlet openings of said mixing plenum.

16. The heat exchanger of claim 11 wherein said plurality of heat transfer conduits includes at least one conduit extending from one of said plurality of outlet openings of said mixing plenum to a side wall of the vat.

17. A heat exchanger for a fryer having a vat filled to a selected level with shortening, said heat exchanger comprising:
   a plurality of heat transfer conduits each having an inlet end and an outlet end, at least one of said plurality of heat transfer conduits being vertically offset relative to another one of said plurality of heat transfer conduits along a vertical plane taken through said plurality of heat transfer conduits;
   at least one mixing plenum having at least one inlet opening and at least one outlet opening, some of said plurality of heat transfer conduits being sealingly connected to said mixing plenum;
   wherein said plurality of heat transfer conduits and said at least one mixing plenum are disposed within the vat of shortening.

18. The heat exchanger of claim 17 wherein said at least one of said plurality of heat exchange conduits is sloping from said inlet end to said outlet end to thereby define said vertical offset.

19. The heat exchanger of claim 17 wherein a longitudinal axis of said at least one of said plurality of heat exchange conduits is disposed above a longitudinal axis of said another heat exchange conduit to thereby define said vertical offset.

20. The heat exchanger of claim 17 wherein said plurality of heat transfer conduits includes an inclining conduit sloping upwards from said inlet end to said outlet end.

21. The heat exchanger of claim 17 wherein said plurality of heat transfer conduits includes an declining conduit sloping downwards from said inlet end to said outlet end.

22. The heat exchanger of claim 17 wherein said at least one mixing plenum comprises a first mixing plenum and a second mixing plenum.

23. The heat exchanger of claim 22 wherein said plurality of heat transfer conduits include at least one inlet heat transfer conduit sealingly connected to said first mixing plenum and at least one mixing heat transfer conduit sealingly connected between said first and second mixing plenums.

24. The heat exchanger of claim 23 wherein said plurality of heat transfer conduits further includes at least one outlet heat transfer conduit sealingly connected to said second mixing plenum.

25. The heat exchanger of claim 22 wherein said plurality of heat transfer conduits includes at least one mixing heat transfer conduit sealingly connected between said first and second mixing plenums and at least one outlet heat transfer conduit sealingly connected to said second mixing plenum.

26. The heat exchanger of claim 25 wherein said plurality of heat transfer conduits further includes at least one inlet heat transfer conduits sealingly connected to said first mixing plenum.

27. The heat exchanger of claim 22 wherein said plurality of heat transfer conduits includes at least two mixing heat transfer conduits sealingly connected between said first and second mixing plenums, one said mixing heat transfer conduit defining said vertical offset relative to said other mixing heat transfer conduit.

* * * * *